June 10, 1924.                                                   1,497,478
W. D. BLUDWORTH
EASILY DUMPED WHEELBARROW
Filed July 27, 1922
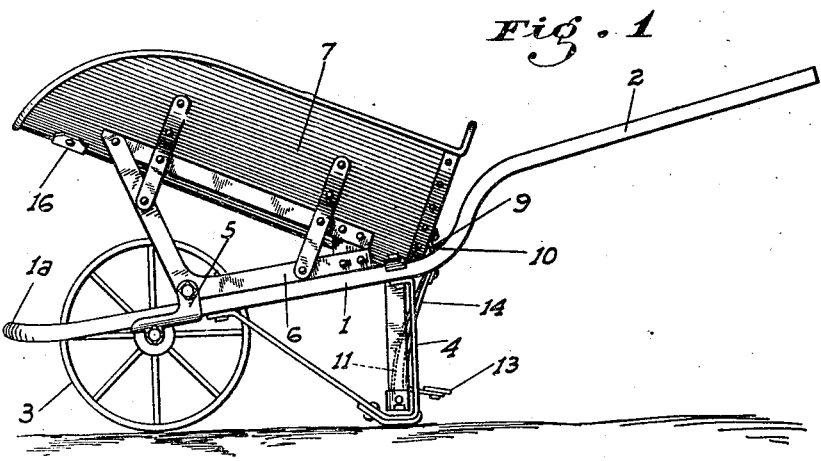
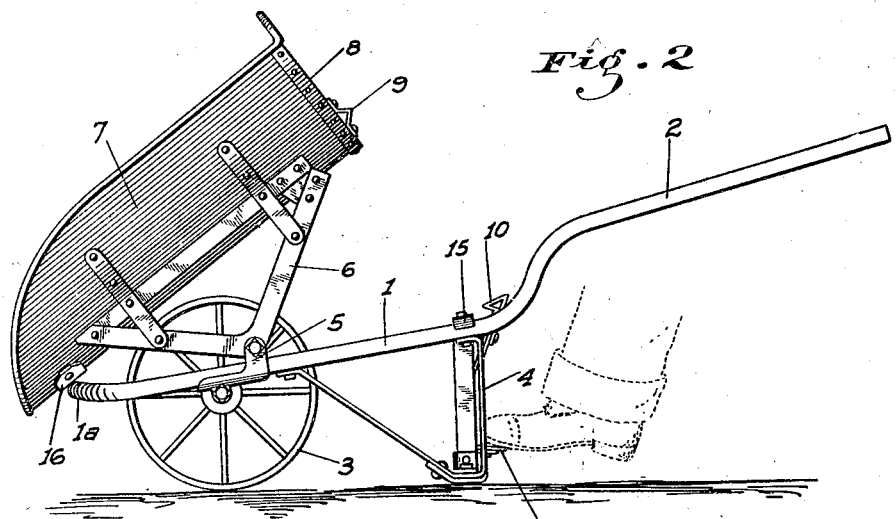
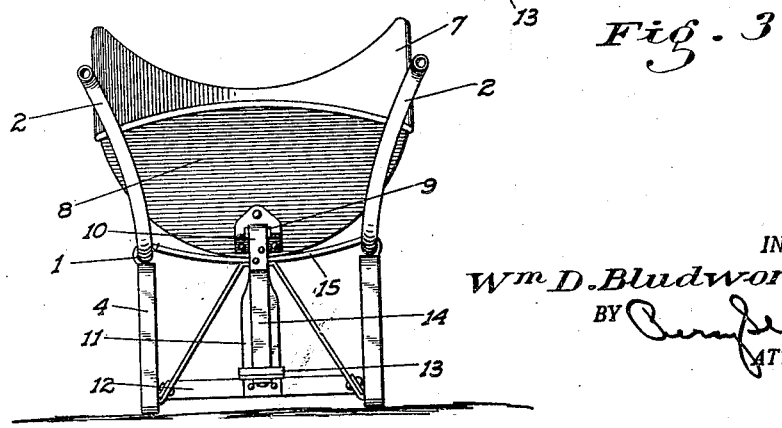
INVENTOR.
Wm D. Bludworth
BY
ATTORNEY Patented June 10, 1924.

1,497,478

UNITED STATES PATENT OFFICE.

WILLIAM D. BLUDWORTH, OF SACRAMENTO, CALIFORNIA.

EASILY-DUMPED WHEELBARROW.

Application filed July 27, 1922. Serial No. 577,901.

*To all whom it may concern:*

Be it known that I, WILLIAM D. BLUDWORTH, a citizen of the United States, residing at Sacramento, county of Sacramento, State of California, have invented certain new and useful Improvements in an Easily-Dumped Wheelbarrow; and I do declare the following to be a full, clear, and exact description of the same, reference being had to the accompanying drawings, and to the characters of reference marked thereon, which form a part of this application.

This invention relates to improvements in wheelbarrows of the general utility kind, and is especially adapted for use in connection with the hauling and dumping of material into concrete mixers, on account of its easy dumping features.

The present invention is also especially intended as an improvement over that type of wheelbarrow shown in my Patent No. 1292689, dated January 28th, 1919, the principal object of this invention being to simplify the scoop-latch means so that the scoop may be more easily held or released, and to mount the scoop on an auxiliary and tiltable frame mounted on the main wheelbarrow frame, so that the scoop may be made of relatively light material and still be substantial and free from any tendency to warp out of shape irrespective of the movement or position of the scoop.

A further object of the invention is to produce a simple and inexpensive device and yet one which will be exceedingly effective for the purposes for which it is designed.

These objects I accomplish by means of such structure and relative arrangement of parts as will fully appear by a perusal of the following specification and claims.

In the drawings similar characters of reference indicate corresponding parts in the several views.

Fig. 1 is a side elevation of the wheelbarrow with the scoop in its normal or load carrying position.

Fig. 2 is a similar view with the scoop in the dumping position.

Fig. 3 is a rear end view of the device.

Referring now more particularly to the characters of reference on the drawings, the numeral 1 represents the main frame of the wheelbarrow, which preferably comprises a single U-shaped bar, set in a horizontal plane, and extending upwardly at the rear end to form handles 2. Between the frame members 1, adjacent the forward end thereof, is mounted a wheel 3, while to the rear of said wheel are rigid supporting legs 4.

Pivotally mounted in lugs 5 projecting upwardly from the frames 1 and set slightly to the rear of the axis of the wheel 3 are transversely spaced and substantially triangular auxiliary frame members 6, vertically disposed, between and to which is fixed the scoop 7, the bottom of which is preferably circular in cross section, and extends in a straight line longitudinally, the front end of said scoop being open from the bottom up. Fixed to the back member 8 of the scoop is a lug 9 adapted to be engaged by a latch member 10 formed on the upper end of a spring bar 11 fixed at its lower end on a cross bar 12 extending between the legs 6 near their lower ends. The spring-bar tends to move the latch 10 forwardly, so as to hold it in constant engagement with the lug 9. This tendency is offset when it is desired to release the scoop, and the latch is pulled away from the lug, by means of a foot pad 13 mounted near the ground on the lower end of a spring bar 14 positioned to the rear of the bar 11 and connected to the latter at its upper end.

It will therefore be seen that when the pad 13 is depressed, the latch 10 will be moved to the rear of the lug 9, and will be disengaged from the same.

When the scoop is in its normal or latched position, the rear arms of the frames 6 rest on the bars 1 thereunder, thus taking the strain from the pivotal connections, while additional support for the scoop itself is provided by means of a saddle 15 extending between the members 1 at the rear end of the scoop and in which the bottom of the latter rests.

When the scoop is dumped, the front end thereof rests on the cross member 1ª of the frame 1 ahead of the wheel, a transverse reinforcing plate 16 being fixed on and under the bottom of the scoop at this point.

The scoop is pivoted with respect to the axis of the wheel so that when the handles and frame are raised to the normal wheeling position, the center of weight of the scoop if loaded will be but very slightly to the rear of the wheel-axis, the scoop being then tilted to the rear. Therefore to dump the scoop, the operator need only press the pad 13 and either raise the handles and frame a trifle higher than normal, or give a quick upward jerk to the handles, either of which movements will cause the equilibrium of the scoop to be upset and the latter will tilt forwardly, thus allowing the load to slide therefrom without further effort on the part of the operator.

When the scoop is returned to its normal position, manipulation of the spring catch member is unnecessary, since the lug 9 will first automatically pass by and then be engaged by the same.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention as defined by the appended claims.

Having thus described my invention what I claim as new and useful and desire to secure by Letters Patent is:

1. A wheel barrow comprising a wheel-supported frame, an auxiliary frame pivoted thereon, a scoop supported by said auxiliary frame, the latter being adapted to tilt forwardly to cause the scoop to dump, a lug on the back of the scoop, a latch member for engaging the same, a spring bar fixed to the latch at one end and to the main frame at the lower end, said bar normally acting to press the latch forwardly and into engagement with the lug, and foot controlled means connected to the latch for moving the same away from the lug against the pressure of the spring.

2. A wheel barrow comprising a wheel-supported frame, an auxiliary frame pivoted thereon, a scoop supported by said auxiliary frame, the latter being adapted to tilt forwardly to cause the scoop to dump, a lug on the back of the scoop, a latch member for engaging the same, a spring bar fixed to the latch at one end and to the main frame at the lower end, said bar normally acting to press the latch forwardly and into engagement with the lug, an additional spring bar connected to the first named bar adjacent and to the rear of the latch and depending downwardly therefrom, and a foot pad at the lower end of said additional bar.

3. A wheel-barrow comprising a wheel-supported frame, a scoop, and a longitudinal V shaped auxiliary frame on which the scoop is mounted, said auxiliary frame being pivoted at its apex on the main frame and its rear portion being adapted to rest on the main frame, whereby the strain is then taken off the pivots and the scoop has an upward and forward tilt.

In testimony whereof I affix my signature.

WILLIAM D. BLUDWORTH